(12) United States Patent
Urban

(10) Patent No.: US 12,378,936 B2
(45) Date of Patent: Aug. 5, 2025

(54) CLEANING DEVICE WITH CLEANING MEDIUM RECEPTION CHAMBER FOR RECEIVING CLEANING MEDIUM AFTER PASSING A DEVICE TO BE CLEANED

(71) Applicant: TUNAP GMBH & CO. KG, Wolfratshausen (DE)

(72) Inventor: Alfons Urban, Bad Heilbrunn (DE)

(73) Assignee: TUNAP-GMBH & CO.KG, Wolfratshausen (DE)

(*) Notice: Subject to any disclaimer, the term of this patent is extended or adjusted under 35 U.S.C. 154(b) by 118 days.

(21) Appl. No.: 17/436,504

(22) PCT Filed: Feb. 18, 2020

(86) PCT No.: PCT/EP2020/054264
§ 371 (c)(1),
(2) Date: Sep. 3, 2021

(87) PCT Pub. No.: WO2020/178023
PCT Pub. Date: Sep. 10, 2020

(65) Prior Publication Data
US 2022/0186700 A1 Jun. 16, 2022

(30) Foreign Application Priority Data
Mar. 4, 2019 (DE) .................. 10 2019 105 362.5

(51) Int. Cl.
*B08B 3/00* (2006.01)
*B08B 9/00* (2006.01)
(Continued)

(52) U.S. Cl.
CPC .......... *F02M 65/008* (2013.01); *B08B 9/032* (2013.01); *B08B 9/0323* (2013.01);
(Continued)

(58) Field of Classification Search
CPC ........ F02M 65/00–008; B08B 9/00–46; B08B 3/00–14; G01F 15/02–046; F02D 41/00–408
See application file for complete search history.

(56) References Cited

U.S. PATENT DOCUMENTS 4,062,472 A * 12/1977 Taube ................. B05B 12/1418
222/1
4,845,979 A * 7/1989 Farenden ............. F02M 65/008
73/114.58
(Continued)

FOREIGN PATENT DOCUMENTS

CN        1392334 A      1/2003
CN    2 06 668 408 U    11/2017
(Continued)

OTHER PUBLICATIONS

International Search Report and Written Opinion of PCT/EP2020/054264, May 15, 2020, 15 pages.
(Continued)

*Primary Examiner* — Kaj K Olsen
*Assistant Examiner* — Richard Z. Zhang
(74) *Attorney, Agent, or Firm* — Womble Bond Dickinson (US) LLP

(57) ABSTRACT

A cleaning device for cleaning an interior of a device to be cleaned having an adapter for mounting the device to be cleaned, a cleaning medium reception chamber for receiving cleaning medium driven through the device to be cleaned when mounted on the adapter, a drive unit for driving cleaning medium from a cleaning medium reservoir through the device to be cleaned and into the cleaning medium reception chamber, and a detection unit comprises a flowmeter for measuring a flow rate of the cleaning medium, the detection unit comprises a thermometer, and is configured for determining the change of viscosity by measuring the
(Continued)

temperature of the cleaning medium such that the flow rate measured by the flowmeter is correctable so as to compensate a change of viscosity at changing temperatures.

20 Claims, 8 Drawing Sheets

(51) Int. Cl.
  *B08B 9/032* (2006.01)
  *F02M 65/00* (2006.01)
  *G01F 15/02* (2006.01)
(52) U.S. Cl.
  CPC .............. *B08B 9/0325* (2013.01); *B08B 3/00* (2013.01); *B08B 9/00* (2013.01); *B08B 2209/032* (2013.01); *G01F 15/02* (2013.01)

(56) References Cited

U.S. PATENT DOCUMENTS

| | | | | |
|---|---|---|---|---|
| 5,086,745 | A * | 2/1992 | Nishimura | G01F 1/6965 73/114.34 |
| 5,339,845 | A * | 8/1994 | Huddas | F01D 25/002 134/169 R |
| 6,178,827 | B1 * | 1/2001 | Feller | G01F 1/662 73/861.27 |
| 6,234,002 | B1 | 5/2001 | Sisney et al. | |
| 6,327,718 | B1 * | 12/2001 | Ono | E03D 9/08 4/420.2 |
| 9,995,263 | B1 | 6/2018 | Rodriguez et al. | |
| 2004/0098811 | A1 * | 5/2004 | Tuttle | D06F 95/00 68/3 R |
| 2006/0090567 | A1 * | 5/2006 | Shamine | F02M 65/003 73/729.2 |
| 2007/0101959 | A1 * | 5/2007 | Soejima | F01L 1/34 73/114.26 |
| 2018/0313265 | A1 * | 11/2018 | Datar | C11D 7/261 |

FOREIGN PATENT DOCUMENTS

| | | | |
|---|---|---|---|
| CN | 107336354 A | * | 11/2017 |
| CN | 206668408 | * | 11/2017 |
| CN | 107829824 | * | 3/2018 |
| CN | 107829824 A | | 3/2018 |
| CN | 108843475 A | | 11/2018 |
| DE | 93 15 408 U1 | | 2/1995 |
| DE | 93 15 408.9 U1 | | 3/1995 |
| DE | 102006013634 | * | 9/2007 |
| EP | 0 636 767 A1 | | 2/1995 |
| EP | 2 609 310 | | 7/2013 |
| JP | 2000130298 A | * | 5/2000 |
| JP | 2007033373 A | * | 2/2007 |
| JP | 2008232741 A | * | 10/2008 |
| JP | 2012078270 A | * | 4/2012 |
| WO | 90/01623 A1 | | 2/1990 |
| WO | WO9001623 | * | 2/1990 |
| WO | 00/63552 A1 | | 10/2000 |
| WO | WO2005108776 | * | 11/2005 |

OTHER PUBLICATIONS

German Search Report of 10 2019 105 362.5, Oct. 31, 2019, 9 pages.

* cited by examiner

CLEANING DEVICE WITH CLEANING MEDIUM RECEPTION CHAMBER FOR RECEIVING CLEANING MEDIUM AFTER PASSING A DEVICE TO BE CLEANED

CROSS-REFERENCE TO RELATED APPLICATIONS

This application is a U.S. National Phase Patent Application of International Application Number PCT/EP2020/054264, filed on Feb. 18, 2020, which claims priority of German Patent Application Number 10 2019 105 362.5, filed on Mar. 4, 2019, the entire content of each of which is incorporated herein by reference.

FIELD

The invention relates to a cleaning device, a cleaning system, an arrangement, and a method of cleaning a device to be cleaned.

BACKGROUND

In internal combustion engines, such as gasoline and diesel engines, contaminants frequently occur in the inlet channels and on the inlet valves. Such contaminants are caused, in particular, by fuels of lower quality and/or unfavorable operation of the engines. The contaminants disrupt the engine operation more and more as they grow, since the required inlet cross sections are no longer achieved when the inlet valves are opened. EP 2,609,310 A1 discloses a method for cleaning coked cavities of an internal combustion engine.

Other cleaning issues arise in the field of fuel injection. Fuel injection may particularly denote the introduction of fuel in an internal combustion engine or gas turbine engine by an injector. Also injectors of combustion engines or gas turbine engines may be subject to contamination after prolonged use.

Efficiently cleaning technical components, such as injectors and other devices to be cleaned, is still an issue.

There may be a need to efficiently clean a device to be cleaned.

SUMMARY

According to an exemplary embodiment of the invention, a cleaning device for cleaning an interior of a device to be cleaned is provided, wherein the cleaning device comprises an adapter for mounting the device to be cleaned, a cleaning medium reception chamber for receiving cleaning medium driven through the device to be cleaned when mounted on the adapter, and a drive unit for driving cleaning medium from a cleaning medium reservoir through the device to be cleaned, when mounted on the adapter, and into the cleaning medium reception chamber.

According to another exemplary embodiment of the invention, a cleaning system is provided which comprises a cleaning device having the above mentioned features, and a device to be cleaned mounted on the adapter.

According to another exemplary embodiment of the invention, an arrangement is provided which comprises a cleaning device having the above mentioned features, and a cleaning medium reservoir containing cleaning medium and being in fluid communication with the cleaning device for enabling cleaning medium from the cleaning medium reservoir to be driven through the device to be cleaned, when mounted on the adapter.

According to yet another exemplary embodiment of the invention, a method of cleaning a device to be cleaned is provided, wherein the method comprises mounting the device to be cleaned on an adapter and in fluid communication with a cleaning medium reception chamber, and driving a cleaning medium from a cleaning medium reservoir through the device to be cleaned into the cleaning medium reception chamber.

According to an exemplary embodiment of the invention, a cleaning device is provided which is capable of properly, efficiently and reliably cleaning an interior of a device to be cleaned. For this purpose, a cleaning medium (such as a cleaning liquid, which may preferably be heated for improving cleaning efficiency) may be driven through the device to be cleaned in a flow-through architecture to thereby achieve the desired cleaning effect. Advantageously, the cleaning medium may then be further driven from the interior of the device to be cleaned into a fluidically connected cleaning medium reception chamber, in particular for collection or accumulation. Thus, one or more parameters (such as the amount of cleaning medium in the cleaning medium reception chamber and/or its optical properties as inspectable in the cleaning medium reception chamber) being indicative for a cleaning success may be analyzed in a simple way. This may allow ensuring that a cleaning process has in fact been successful. Alternatively, cleaning issues may be identified, so that a cleaning procedure may have to be repeated or refined. For instance, it can be ensured by accumulating used cleaning medium in the cleaning medium reception chamber that a sufficient amount of cleaning medium has in fact passed the interior of the cleaning device. Also the colour of the used cleaning medium may be an indicator for a successful cleaning process. Thus, the cleaning device not only ensures a quick and efficient cleaning of the device to be cleaned, but additionally allows verifying that an executed cleaning procedure has in fact been successful to clean the device to be cleaned. This is in particular highly advantageous in cleaning applications in which a proper cleaning of the device to be cleaned is important for safety reasons, for instance when the device to be cleaned is an injector for a helicopter. Thus, the cleaning device also improves the safety of operation of the device to be cleaned after having completed the cleaning process.

According to an exemplary embodiment of the invention, the cleaning device comprises a thermal block which is thermally coupled to the drive unit, in particular a motor unit of the drive unit. The thermal block is further thermally coupled to the cleaning medium flowing to the adapter or the cleaning medium reservoir for providing a thermal bridge between the cleaning medium and the drive unit.

In the following, further exemplary embodiments of the cleaning device, the cleaning system, the arrangement, and the method will be explained.

In an embodiment, the cleaning medium comprises an alkaline or an acidic liquid, such as inorganic or organic bases or inorganic or organic acids in combination with a solvent, such as alcohol, saturated or unsaturated hydrocarbons, water or mixtures thereof.

However, a skilled person will understand that the composition of the cleaning medium may be appropriately selected in accordance with a specific cleaning procedure or cleaning task, and may thus largely vary.

In an embodiment, the adapter is mounted or configured to be mounted on the cleaning medium reception chamber.

Thus, the adapter may have two connection sides or provisions. One connection provision (for instance on a top side of the adapter) may be specifically configured for mounting the device to be cleaned, whereas the other connection provision (for instance on a bottom side of the adapter) may be specifically configured for being mounted on the cleaning medium reception chamber.

In an embodiment, the adapter is configured so that cleaning medium driven through the device to be cleaned, when mounted on the adapter, is subsequently driven through the adapter. Hence, the adapter may be interposed between the device to be cleaned and the cleaning medium reception chamber or may surround the device to be cleaned. The adapter itself may or may not form part of the flow path of the cleaning medium from cleaning medium reservoir to the device to be cleaned up to the cleaning medium reception chamber.

In an embodiment, the cleaning medium reception chamber is at least partially optically transparent for enabling visual inspection of cleaning medium driven through the device to be cleaned, when mounted on the adapter, into the cleaning medium reception chamber. Correspondingly, the method may comprise accumulating and/or inspecting the cleaning medium having passed the device to be cleaned in the cleaning medium reception chamber. By making the cleaning medium reception chamber at least partially optically transparent, it may become possible for a user to inspect the cleaning medium accumulated in the cleaning medium reception chamber after passing the interior of the device to be cleaned. Thus, quantity and/or optical properties (for instance a contamination of cleaning medium with dirt or dust which has been removed out of the interior of the device to be cleaned) can be easily inspected by a user during and/or after the cleaning process. Hence, a very intuitive and simple mechanism is provided enabling a user to verify that the cleaning procedure has been successful, for instance that a sufficient amount of cleaning medium has in fact been driven through the device to be cleaned.

In an embodiment, the method comprises analyzing at least one of the group consisting of an amount of cleaning medium accumulated in the cleaning medium reception chamber, and a spray pattern of the cleaning medium in the cleaning medium reception chamber. The amount of cleaning medium having passed a device to be cleaned (which may be easily inspected using a scale at the cleaning medium reception chamber) may be a reliable measure for a sufficiently long and successfully completed cleaning process. When a device to be cleaned has been properly cleaned, this can also be indicated by the spray pattern of cleaning medium having passed the device to be cleaned during the cleaning procedure. For instance, a substantially conically shaped spray pattern may be indicative of a successful cleaning process. In contrast to this, a small number of intense streams of cleaning medium flowing out of the device to be cleaned can be the fingerprint of an incomplete cleaning process. Furthermore, it is possible to inspect as to whether each hole of the device to be cleaned and through which cleaning medium shall pass is still blocked or has been opened by the cleaning process, since an opened hole may correspond to a correspondingly successful cleaning. More generally, by inspecting the cleaning pattern, it can be determined visually or optically whether a target spray pattern (indicating a successful cleaning process) corresponds to an actual cleaning pattern (as expected in the cleaning medium reception chamber).

In an embodiment, the at least partially optically transparent cleaning medium reception chamber comprises a scale (for instance one or more markers) for indicating an amount of cleaning medium driven through the device to be cleaned, when mounted on the adapter. Such a scale may indicate to a user in an intuitive way which amount of cleaning medium has passed the device to be cleaned during a cleaning procedure. For instance, the scale can indicate a minimum amount of cleaning medium which shall have passed the device to be cleaned in order to ensure proper cleaning.

In an embodiment, the cleaning medium reception chamber comprises, in particular at a bottom, an outlet for draining cleaning medium which has been driven through the device to be cleaned, when mounted on the adapter, into the cleaning medium reception chamber. Preferably, the adapter may be mounted on the top side of the cleaning medium reception chamber, whereas the outlet for draining used cleaning medium may be arranged on a bottom side. When the outlet for draining cleaning medium is provided at a bottom of the cleaning medium reception chamber, closing the bottom outlet may allow accumulating all cleaning medium having passed the device to be cleaned during a cleaning and/or test procedure so as to use this information for evaluating the cleaning process. At the same time, arranging the outlet at the bottom side of the cleaning medium reception chamber allows properly draining substantially the entire accumulated cleaning medium by simply opening the outlet, for instance using a valve, which may be promoted by a suction pump and supported by the force of gravity.

In an embodiment, the cleaning device comprises a valve in fluid communication with the outlet for selectively enabling or disabling draining of cleaning medium from the cleaning medium reception chamber. For instance, the valve may be an automatically operated solenoid valve or a manually operated tap. The mentioned valve may be closed for accumulating cleaning medium having passed a device to be cleaned during a cleaning process. However, the valve may also be opened for removing accumulated draining medium, for instance before starting a subsequent cleaning procedure. The valve may be manually operable by a user and/or may be operable or switchable by a control unit controlling operation of the cleaning device.

In an embodiment, the drive unit comprises a forcing pump (or positive displacement pump or pressure pump) for driving cleaning medium from the cleaning medium reservoir (in particular through a filter) through the device to be cleaned, when mounted on the adapter. By such a forcing pump, the cleaning medium may be pushed from a cleaning medium reservoir through the device to be cleaned and into the cleaning medium reception chamber. As a forcing pump, it is for instance possible to use a piston pump, a membrane pump or a peristaltic pump.

In an embodiment, the drive unit comprises (in particular in addition to said forcing pump) a suction pump for sucking cleaning medium out of the cleaning medium reception chamber. By the (in particular additional) provision of a suction pump, it is possible to draw or aspirate the cleaning medium from the cleaning medium reception chamber to a desired destination, for instance (in particular through a filter) back into the cleaning medium reservoir for repeated use or into a waste container for disposal. In particular, the combination of a forcing pump upstream of the device to be cleaned and a suction pump downstream of the device to be cleaned has turned out as a powerful mechanism of reliably driving the cleaning medium through the cleaning flow path.

In an embodiment, the cleaning device comprises a detection unit for detecting data indicative of a flow rate and/or a pressure of cleaning medium driven through the device to be cleaned, when mounted on the adapter. By detecting flow rate (in particular a volume flow or a mass flow) and/or a pressure of the cleaning medium it is possible to improve monitoring of the cleaning process. A decreasing flow rate may be indicative of an empty cleaning medium reservoir or blockage of the flow path. Also an increasing pressure may be indicative of blockage of the flow path. An increasing flow rate may be indicative of a successful removal of a blockage in a device to be cleaned by removing a contamination. Detecting the flow rate during the cleaning process may also allow calculating an overall amount of cleaning medium having passed the device to be cleaned. Such a determined overall amount of cleaning medium may also be compared with an amount of cleaning medium which can be read on a scale of an optically transparent cleaning medium reception chamber. In particular, a combination of a visual inspection of cleaning medium in the cleaning medium reception chamber and detection data captured by the detection unit may allow ensuring that a cleaning process has in fact been successful. This may in particular be important for safety-relevant devices to be cleaned.

In an embodiment, the detection unit is configured for detecting information indicative of a temperature of the cleaning medium and is configured for correcting flow rate information under consideration of a viscosity of the cleaning medium at the detected temperature. The viscosity of the cleaning medium may change when its temperature changes. Therefore, raw detection data detected by a flowmeter may lack reliability, since they do not consider the impact of viscosity on the measured flow rate. In order to overcome this shortcoming, an exemplary embodiment may introduce a thermometer in the detection unit detecting the temperature of the passing cleaning medium. The measured flow rate may then be corrected in order to compensate for temperature changes of the cleaning medium. Thereby, a highly precise flow rate can be determined.

In an embodiment, the cleaning device comprises at least one further adapter for mounting at least one further device to be cleaned, and at least one further cleaning medium reception chamber for receiving cleaning medium driven through the at least on further device to be cleaned, when mounted on the at least one further adapter. Highly advantageously, a plurality of adapters with assigned cleaning medium reception chambers may be connected to a single flow path of cleaning medium which may be provided from a common cleaning medium reservoir and which may be driven by a common drive unit. For instance, cleaning medium from the cleaning medium reservoir may be pumped by a common forcing pump to a fluidic splitting unit at which the flow splits into different paths, each being assigned to a respective adapter, a respective device to be cleaned, and an assigned cleaning medium accommodation volume. Thus, by centrally operating one common forcing pump, the driven cleaning medium may be split at the splitting unit into multiple paths each of which being connected with a respective device to be cleaned, followed by an adapter and a cleaning medium reception chamber. Thus, multiple cleaning procedures for cleaning a plurality of devices to be cleaned may be carried out simultaneously by connecting the devices to be cleaned fluidically in parallel during cleaning. This may multiply the efficiency of the cleaning procedure by the number of adapters and assigned cleaning medium reception chambers. For instance, it is possible to connect even more than two adapters and assigned cleaning medium reception chambers to a single forcing pump, for instance at least five adapters and assigned cleaning medium reception chambers.

Still referring to the previously described embodiment, the cleaning device may comprise a flow splitter for splitting a flow of cleaning medium from the cleaning medium reservoir for providing a parallel supply of cleaning medium to the device to be cleaned, when mounted on the adapter, and to the at least one further device to be cleaned, when mounted on the at least one further adapter. This architecture renders it possible to implement only a single pressure pump or forcing pump to guide the cleaning medium towards a plurality of devices to be cleaned connected fluidically in parallel. The fresh cleaning medium may be supplied to each of the adapters and to each of the devices to be cleaned. Thus, a compact configuration of the cleaning device may be combined with an efficient cleaning with high throughput. The individual cleaning medium reception chambers may nevertheless allow to individually assess the success of the cleaning procedure for each of the devices to be cleaned.

Still referring to the previously described embodiment, the cleaning device may comprise a flow combiner for combining a flow of cleaning medium draining from the cleaning medium reception chamber and from the at least one further cleaning medium reception chamber. After having accumulated the cleaning medium having passed and cleaned multiple devices to be cleaned in parallel in the cleaning medium reception chambers, the various partial flows of cleaning medium may be combined by the flow combiner to a single stream which may for instance be drawn or aspirated by a single suction pump of the drive unit downstream of the devices to be cleaned. Also the provision of a flow combiner synergistically combines a compact configuration of the cleaning device with an efficient cleaning mechanism.

In an embodiment, the cleaning device comprises a heating unit arranged upstream of the adapter for heating cleaning medium driven by the drive unit from the cleaning medium reservoir towards the device to be cleaned, when mounted on the adapter. Heating the cleaning medium before the cleaning procedure may significantly increase the cleaning efficiency. For instance, such a heating unit may be a heating coil surrounding a tube or a tube portion through which the cleaning medium is driven on its way from the cleaning medium reservoir to the one or more adapters. Thus, the cleaning medium may be efficiently heated directly before initiating the cleaning process in the interior of the device to be cleaned. Heating the cleaning medium preferably directly before the cleaning process starts has turned out as a highly efficient mechanism of improving cleaning efficiency, since the cleaning result may become significantly better when a heated cleaning medium is used.

Additionally or alternatively, the arrangement may comprise a heating unit configured for heating the cleaning medium reservoir when accommodated in the casing. In particular, such a heating unit may be arranged within a thermal insulation unit thermally insulating the heated cleaning medium reservoir with regard to an environment.

When a standalone cleaning medium reservoir is implemented, it is also possible that the standalone cleaning medium reservoir is surrounded by a heating sleeve or the like for accomplishing heating of the cleaning medium inside of the cleaning medium reservoir. Advantageously, such a heating sleeve may be combined with a thermal insulation function to thermally decouple the standalone cleaning medium reservoir from an environment. This functional combination may ensure a properly heated cleaning medium even when a standalone cleaning medium reservoir is used.

In an embodiment, the cleaning device comprises a casing in which the cleaning medium reservoir is accommodatable or accommodated. When accommodating the cleaning medium reservoir in a casing, a user may properly connect the cleaning medium reservoir in an intuitive and failure-robust way, for instance by simply pushing a cartridge type cleaning medium reservoir into a corresponding receptacle or accommodation recess. For instance, the fluidic connections of the cleaning medium reservoir may be automatically established when inserting the cleaning medium reservoir into a corresponding recess of the casing of the cleaning device. Furthermore, mounting a cleaning medium reservoir in a casing also enables proper heating of the cleaning medium in the cleaning medium reservoir while being accommodated in the casing. Also thermal isolation of the cleaning medium reservoir to prevent or suppress heat losses can be established efficiently when the cleaning medium reservoir is inserted into a casing.

In a corresponding way, also cleaning medium in a standalone cleaning medium reservoir can be heated, for instance by a heating jacket or sleeve.

In an embodiment, the casing accommodates at least one of at least part of the drive unit, and a control unit for controlling the cleaning device. Thus, the casing may also accommodate one or more additional constituents of the cleaning device such as controller, driving pump, suction pump, one or more filters, etc. This simplifies operation of the cleaning device by a user who only needs to handle a small amount of components for operating the cleaning device.

In an embodiment, the cleaning device comprises a waste container into which cleaning medium driven from the cleaning medium reservoir through the device(s) to be cleaned, when mounted on the adapter, and into the cleaning medium reception chamber is drivable. By collecting used cleaning medium in a waste container for disposal ensures that only pure cleaning medium without contamination from a previous cleaning procedure is used. Thus, a particularly high operation safety may be achieved in particular for applications in which a proper cleaning of the device to be cleaned has an impact on operation safety. An example are injectors for combustion engines or gas turbine engines (for instance for helicopters) for which a proper cleaning and corresponding proper functioning in subsequent operation is of utmost importance.

In another embodiment, the cleaning device comprises a closed loop cleaning medium path configured for enabling cleaning medium to be driven along a closed loop from the cleaning medium reservoir through the device to be cleaned, when mounted on the adapter, and via the cleaning medium reception chamber back to the cleaning medium reservoir. This closed-loop driving of cleaning medium may be repeated multiple times. Thus, already used cleaning medium may be used again in a subsequent cleaning cycle. By providing a closed loop cleaning medium path, cleaning medium may be used multiple times for cleaning devices to be cleaned. As a result, the ecological footprint of the cleaning process can be reduced and the cleaning resources can be used efficiently. However, in particular in terms of safety-relevant applications, it may be advantageous when implementing a closed loop cleaning medium path to remove contaminants from used cleaning medium before reusing said cleaning medium for a subsequent cleaning process. For this purpose, one or more filters for removing contaminants of used cleaning medium may be implemented in the closed loop cleaning medium path, for instance directly upstream of device to be cleaned, when mounted on the adapter, and/or directly downstream of the cleaning medium reception chamber.

In an embodiment, the cleaning device is configured for carrying out a heating mode in which cleaning medium is driven from the cleaning medium reservoir through a heating loop (in which the cleaning medium may be heated, for instance by a surrounding heating coil) back into the cleaning medium reservoir. Advantageously, the cleaning device may be configured for carrying out the heating mode in a heating period during which no cleaning fluid flows through a device to be cleaned, when mounted on the adapter. In such a heating mode, it may be possible to drive cleaning medium from a cleaning medium reservoir through a heating flow path where the driven cleaning medium is heated, back to the cleaning medium reservoir. If desired, this procedure may be repeated multiple times. While flowing through the heating flow path, the cleaning medium may be successively heated, for instance by a heating coil surrounding tubing of the heating flow path. By the continued driving of cleaning medium from the reservoir through the heating flow path and back into the cleaning medium reservoir, repeated heating can be carried out so that the cleaning medium can be brought to a desired cleaning temperature before initiating a cleaning mode. In such a cleaning mode, the previously pre-heated cleaning medium (as described) may be driven into a cleaning flow path including the adapter, the device to be cleaned and the cleaning medium reception chamber, for instance by changing a flow path by switching a valve or the like.

In an embodiment, the device to be cleaned is an injector, in particular an injector for fuel injection into a combustion engine or gas turbine engine, more particularly an injector for a helicopter. An injector may form part of an engine of a vehicle such as a helicopter. When such an injector is used in a helicopter or the like for a longer time, it may become dirty so that switching and thus injection accuracy of the injector may become less reliable. By pumping heated cleaning medium (in particular at elevated pressure) through an injection path of such an injector, the interior of the injector may be reliably cleaned so that subsequent operation of the injector in a reliable way may be enabled.

In an embodiment, the device to be cleaned is a normally-closed device to be opened by a flow force of the driven cleaning medium. When the injector is of a type which opens during operation due to flow of a fluid, flow of the cleaning medium may also open the injector during the cleaning process. This allows to operate the cleaning device in a simple way.

In an embodiment, the device to be cleaned is a normally-closed device to be opened upon applying an electric trigger signal to the device to be cleaned. When a device to be cleaned is normally closed and requires an electric signal for opening a path of fluid, the cleaning system may have a corresponding capability of providing such an electric signal for initiating a cleaning process during which the cleaning fluid is to be pumped through the interior of the device to be cleaned through the normally closed path.

In an embodiment, the cleaning medium reservoir is configured as a standalone cleaning medium reservoir. For instance, the cleaning medium reservoir may be a tank or container to be arranged apart from the cleaning device but fluidically connected therewith by hoses or tubes.

In another embodiment, the cleaning medium reservoir is mounted in an interior of a casing of the cleaning device. It may however be even more advantageous to provide the cleaning medium reservoir in a way as to be mounted inside of a casing of the cleaning device because this simplifies an error-free connection of the cleaning medium reservoir to the device to be cleaned. Furthermore, positioning the cleaning medium reservoir inside of a casing of the cleaning device may also allow properly thermally isolating the cleaning medium reservoir from an environment so that, during a heating mode, heating of the cleaning medium in the cleaning medium reservoir for instance by continued guiding of the cleaning fluid through a heating flow path may be accomplished with less thermal losses. Thus, inserting the cleaning medium container into a casing of the cleaning device may also improve the cleaning efficiency of the cleaning device.

In an embodiment, the arrangement comprises a thermal insulation unit thermally insulating the cleaning medium reservoir when mounted in the interior of the casing. For instance, the cleaning medium reservoir may be at least partially surrounded by thermally insulating bodies for accomplishing thermal insulation.

BRIEF DESCRIPTION OF THE DRAWINGS

The aspects defined above and further aspects of the invention are apparent from the examples of embodiment to be described hereinafter and are explained with reference to these examples of embodiment.

DETAILED DESCRIPTION

Figure 1:
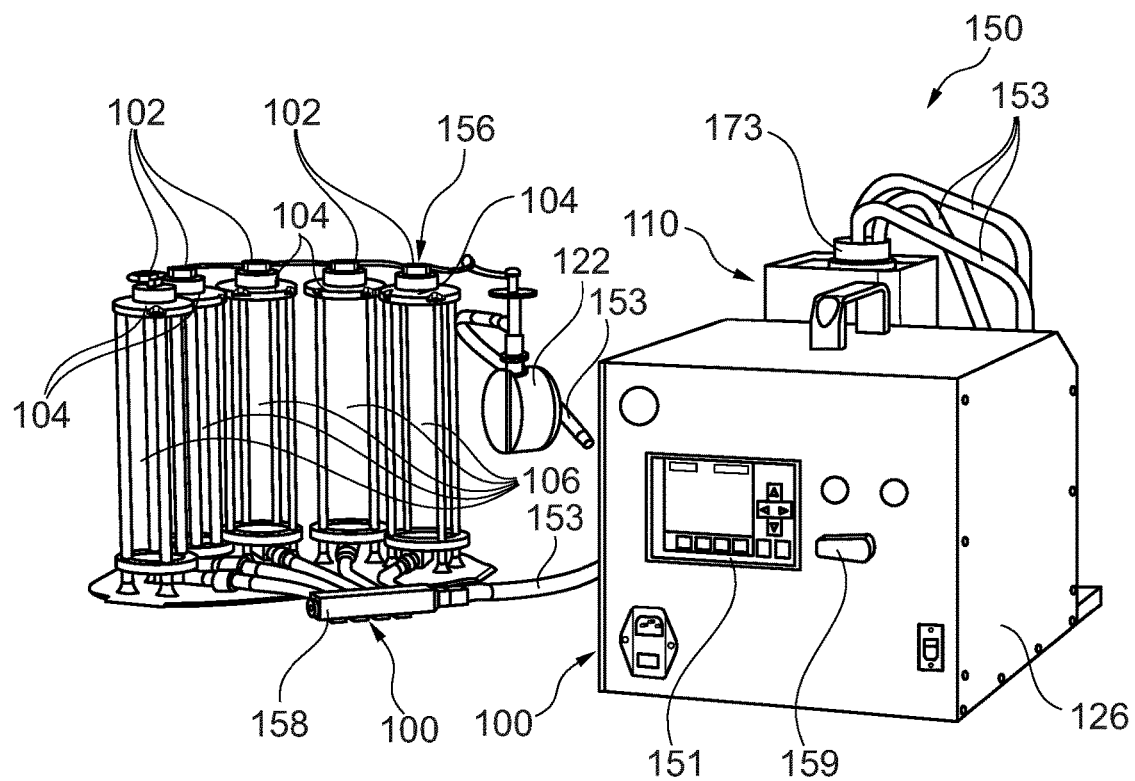
FIG. 1 illustrates a three-dimensional front side view of a cleaning device with cleaning medium reservoir according to an exemplary embodiment of the invention.

The illustrations in the drawings are schematic. In different drawings, similar or identical elements are provided with the same reference signs.

Before, referring to the drawings, exemplary embodiments will be described in further detail, some basic considerations will be summarized based on which exemplary embodiments of the invention have been developed.

According to an exemplary embodiment of the invention, a cleaning device is provided allowing to efficiently clean devices to be cleaned such as injectors, in particular for helicopters. For instance, such an injector may form part of a turbine for a helicopter. Exemplary embodiments of the invention make it possible to quickly maintain or repair injectors by appropriate cleaning if the injector has become dirty and/or blocked during regular use. With a corresponding cleaning device, injectors and other devices to be cleaned can be effectively cleaned and the cleaning result or proper function (for instance by evaluating an injection quantity and spray pattern) can be checked. In particular, cleaning of injectors can be carried out with a cleaning device according to an exemplary embodiment of the invention. Also testing of the cleaning result is possible by connection to the instrument. Moreover, the cleaning device according to an exemplary embodiment allows applying an exactly adjustable pressure of cleaning medium to the interior of the device to be cleaned, for instance a pressure required for properly cleaning an injector. Furthermore, a cleaning device according to an exemplary embodiment of the invention may make it possible to bring a heated chemical as cleaning medium into a rinse cycle. Cleaning using a heated cleaning medium at an elevated temperature (i.e. above room temperature, for instance of at least 35° C., preferably 60° C. or more) may increase the chemical reaction rate and thus the cleaning efficiency. In addition, testing and immediate assessment of the cleaning success can be rendered possible by a cleaning device according to an exemplary embodiment of the invention.

A cleaning medium reservoir (such as a tank or canister) from which the chemistry forming the cleaning medium may be taken, may be a container in which the cleaning medium is contained. Advantageously, such a tank type cleaning medium reservoir can be arranged internally in the cleaning device, for instance in a casing thereof. Transfer of the cleaning medium to a device to be cleaned, when mounted on an adapter of the cleaning device, may be accomplished by a forcing pump and/or a suction pump or another appropriate drive unit. Taking such a measure may have the advantage that a cleaning medium reservoir configured as tank in an interior of the casing can be properly thermally isolated. In an embodiment, it is also possible that a cleaning medium reservoir mounted in a casing of the cleaning device can be configured so as to be heatable. Highly advantageously, exemplary embodiments of the invention provide a cleaning device in which a cleaning success of a device to be cleaned can be assessed immediately after cleaning. During cleaning, a device to be cleaned (such as an injector) can be rinsed with heated cleaning medium, in particular heated cleaning liquid. Thus, an efficient mechanism for rinsing and testing for injectors and other devices to be cleaned can be provided by a cleaning device according to an exemplary embodiment of the invention.

An exemplary embodiment of the invention may implement a rinsing process in which a chemical cleaning agent, as cleaning medium, is heated and introduced in a rinse cycle. Heating the cleaning medium prior to cleaning has turned out to significantly increase the cleaning efficiency. In an embodiment, the described rinsing cycle may additionally use a mechanical factor and/or a time factor. A mechanical injector, as an example for a device to be cleaned, may be opened by pump pressure of the drive unit of the cleaning device and flushed by cleaning medium. A cleaning in intervals may be implemented, because this may prevent blocking or failure of the injector or other devices to be cleaned. When an electronic injector is cleaned as device to be cleaned by the cleaning device, the cleaning device may be configured for controlling the electronic injector electronically for carrying out (in particular initiating) the flushing process.

In an embodiment, a device to be cleaned may be mounted on an adapter which may be configured as a multifunctional holder, on a glass cylinder or other type of cleaning medium reception chamber. The device to be cleaned may inject used cleaning medium into such a glass cylinder, which may be advantageously provided with measuring scales for measuring a volume of cleaning medium having passed the device to be cleaned. At a bottom of the glass cylinder, a suction line may be mounted as a drain for used cleaning medium. Through such a suction line, the cleaning medium may be sucked off again, preferably with a further pump (in particular a suction pump).

In an embodiment, the cleaning device can the configured so as to be operable in three different modes:
1. Heating mode (for heating cleaning medium before cleaning the device to be cleaned)
2. Cleaning or rinsing mode (driving (preferably heated) cleaning medium through the device to be cleaned into the cleaning medium reception chamber)
3. Test mode (optional, for testing the cleaned device to be cleaned and/or assessing success of a previous cleaning procedure of cleaning the device to be cleaned)

Manual or automatic operation of the suction pump and/or the pressure pump or forcing pump may be possible, separately or combined.

The cleaning medium reservoir containing cleaning medium may be inserted in a casing of the cleaning device as a correspondingly designed canister and serves as a mobile tank. With a fluidic interface, a supply (and optionally return) of cleaning medium in the (in particular canister or mobile tank type) cleaning medium reservoir may be guaranteed. Thermal insulation of the cleaning medium reservoir when mounted in the casing of the cleaning device may ensure heat retention of the cleaning medium, and may therefore improve efficiency of the cleaning procedure. In addition, accommodating the cleaning medium reservoir and a casing of the cleaning device may significantly improve safety of operation, because this reliably prevents that a user comes in direct contact with the cleaning medium.

In an embodiment, it is possible that the tank type cleaning medium reservoir is accommodated internally in the cleaning device. This may have the advantage that the cleaning medium reservoir may then be thermally isolated in a simple and highly efficient way. An additional heating of the cleaning medium reservoir may be implemented.

During operation of a cleaning device according to an exemplary embodiment of the invention, it is possible that the cleaning medium is pumped out of the cleaning medium reservoir with a drive unit (such as a forcing or pressure pump) to nozzles. With a suction pump, the cleaning liquid may be sucked out of glass cylinders or any other kind of cleaning medium reception chamber. For example, injectors—as an example for devices to be cleaned—may be rinsed and cleaned with heated detergent in a rinse mode.

According to an exemplary embodiment, pressure of the cleaning medium passing the device to be cleaned can be adjusted, for example via a setting wheel. Pressure adjustment may be accomplished depending on the design of the device to be cleaned and may be measured with a pressure gauge or another detection unit, which may preferably be arranged directly upstream of the device to be cleaned. Such an arrangement may be advantageous to ensure a correct pressure for the subsequent test cycle.

To prepare a test mode of a cleaning device according to an exemplary embodiment, all cleaning medium reception chambers (in particular glass cylinders) may be completely emptied (for instance manually or automatically), for example by a corresponding operation of the suction pump while one or more valves (for instance located at the bottom of the glass cylinders) between cleaning medium reception chamber(s) and suction pump is or are open. Thereafter, the valve(s) may be closed.

After that, in a test mode, the cleaning device may be operated at a certain pressure for a certain time. This time and pressure may be adjusted in accordance with the properties of the device to be cleaned.

A detection unit for detecting the cleaning process may also comprise a flowmeter for measuring a flow rate (for instance in l/h) of cleaning medium to check the proper functioning of the one or more devices to be cleaned. In a preferred embodiment, the detection unit may also measure the temperature of cleaning medium. Depending on its temperature, the viscosity of the cleaning medium may vary. By measuring the temperature of the cleaning medium, the flow rate measured by the flowmeter may be corrected so as to compensate a change of viscosity at changing temperatures. Thus, it may be dispensable for a user to calculate an impact of a changed temperature on the viscosity and therefore the flow rate to suppress or even eliminate artefacts. The cleaning device is therefore less prone to failure and is able to properly clean devices to be cleaned over a wide range of flow rates. The flow rate may change depending on the characteristic properties of the device(s) to be cleaned and depending on the number of devices to be cleaned at the same time. For instance, a flow rate may be about 1.4 l/h when a single injector of relatively small dimension is cleaned or may be even 140 l/h when multiple injectors of relatively large dimension are cleaned.

After the test time has expired, the level of the accumulated cleaning medium in the respective, preferably optically transparent, cleaning medium reception chamber can be read, for instance by a scale. Thus, it can be determined whether the quantity of cleaning medium having passed the device to be cleaned complies with a predefined specification. Also a spray pattern of the device to be cleaned (in particular when embodied as injector) may be assessed via an optically transparent cleaning medium reception chamber). This allows to reliably assess the success of the cleaning procedure.

All components of the cleaning device, such as hoses, couplings, seals, etc. of the cleaning device which may come into direct contact with cleaning medium may be preferably made of chemically resistant material.

Figure 2:
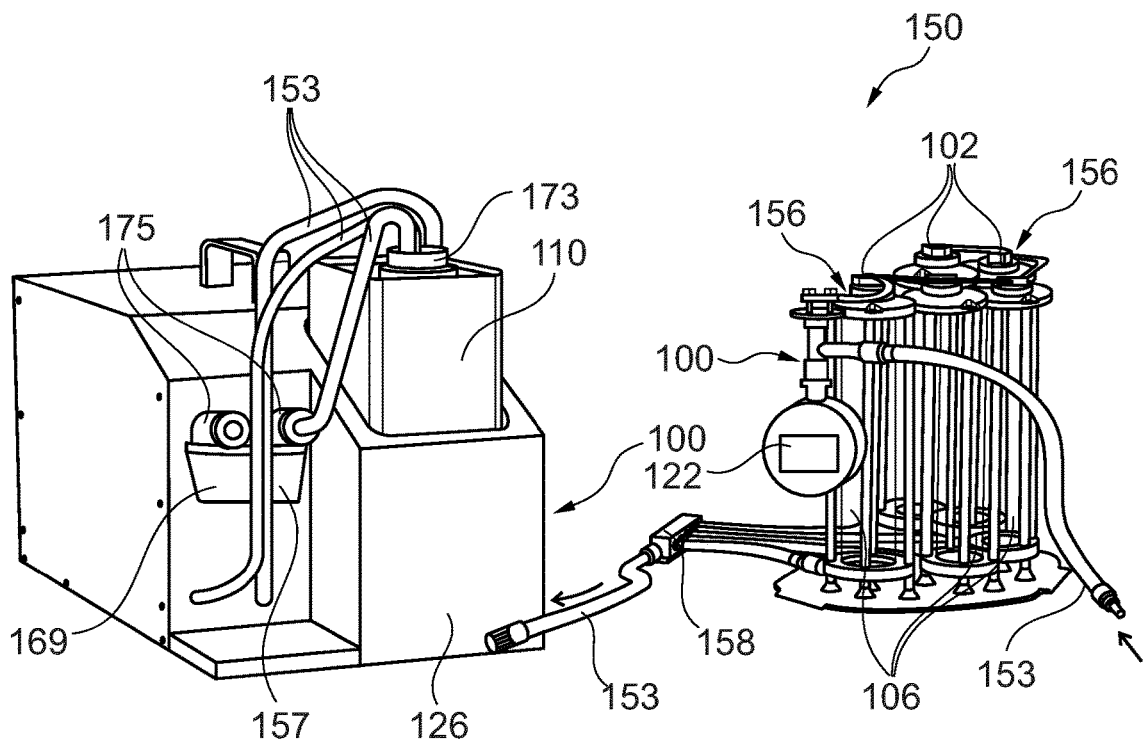
FIG. 2 illustrates a three-dimensional back side view of the cleaning device with cleaning medium reservoir of FIG. 1.
Figure 3:
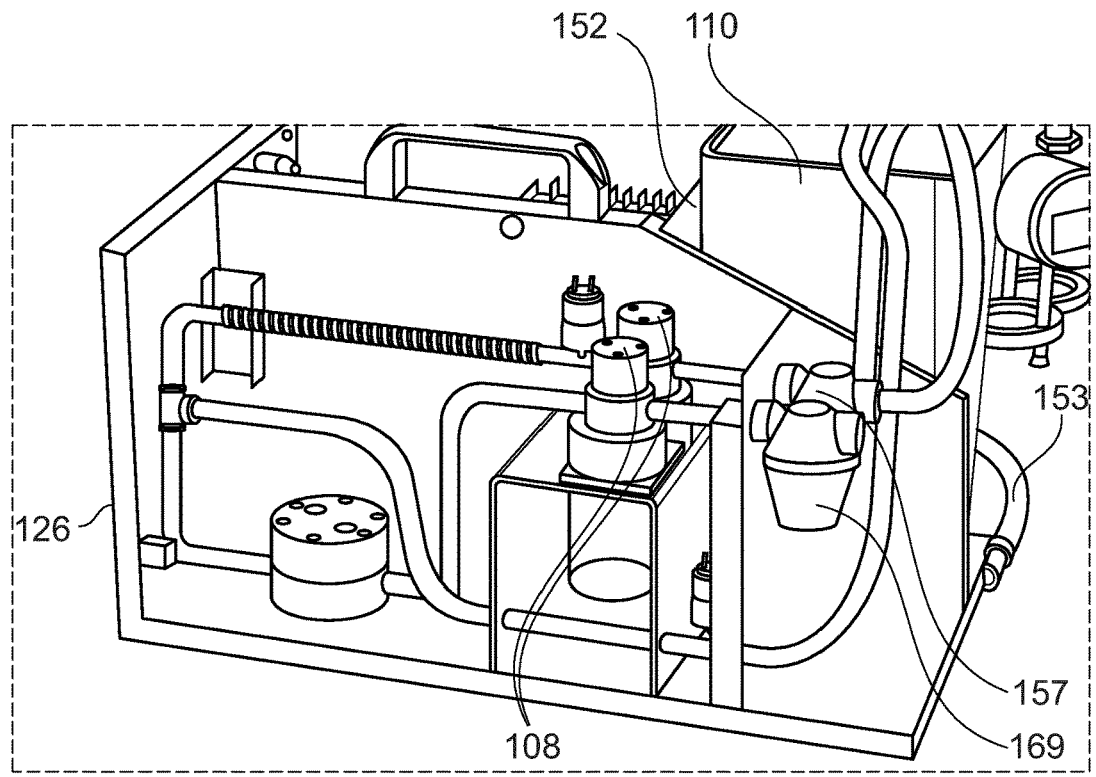
FIG. 3 illustrates an interior of a casing of the cleaning device of FIG. 1 and FIG. 2.
Figure 4:
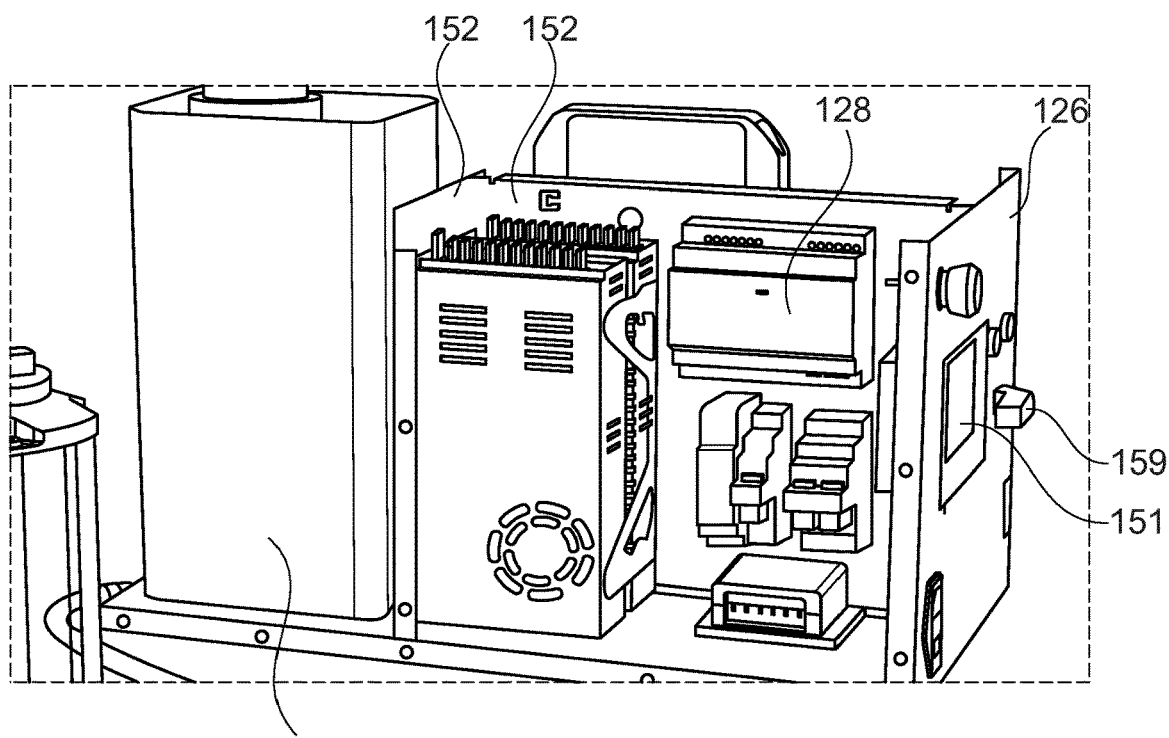
FIG. 4 illustrates another view of the interior of the casing of the cleaning device of FIG. 1 to FIG. 3.
Figure 5:
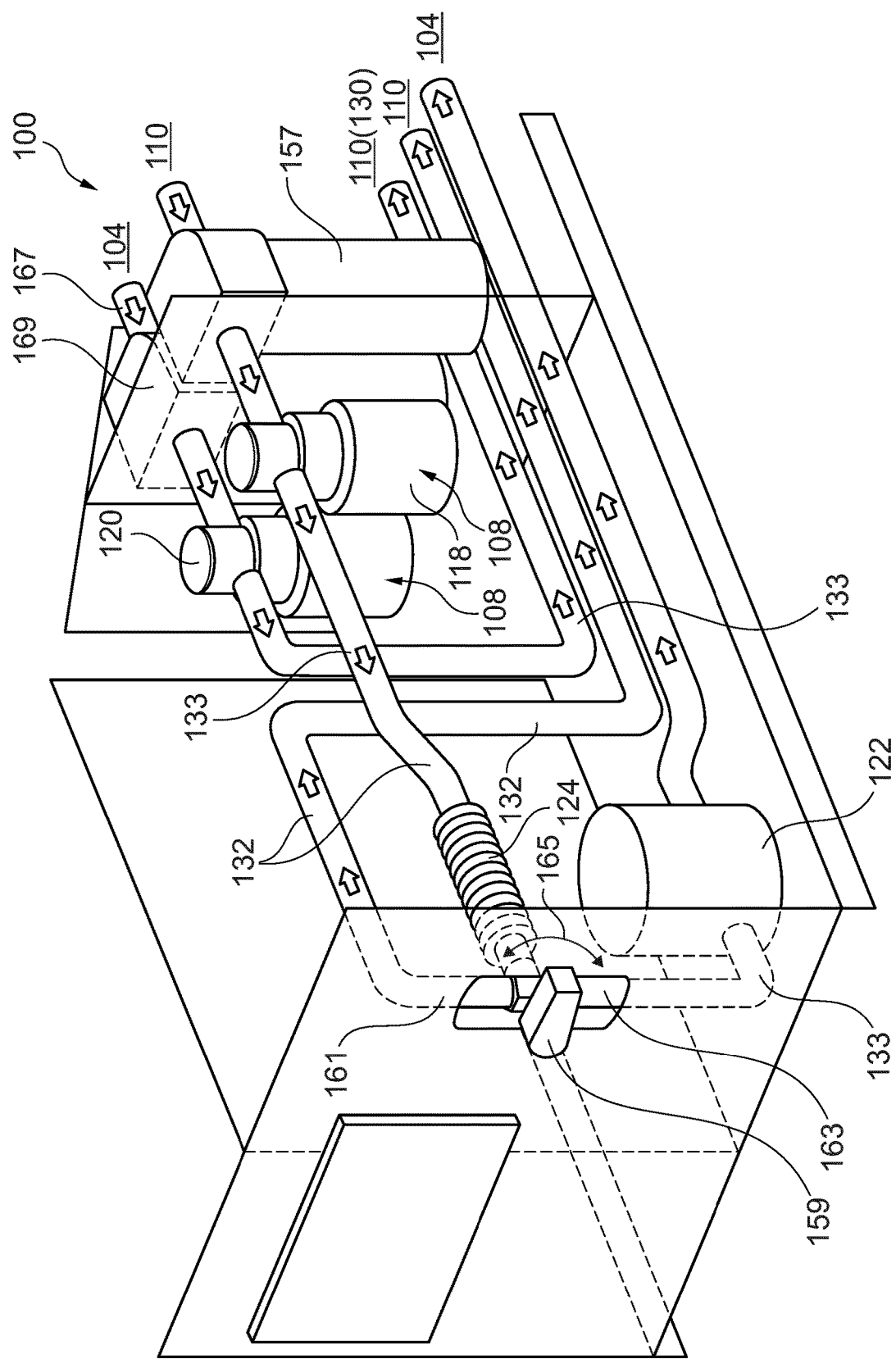
FIG. 5 shows a part of the cleaning device of FIG. 1 to FIG. 4 without casing for illustrating a flow of cleaning medium during cleaning and during heating.

FIG. 1 illustrates a three-dimensional front side view of an arrangement 150 composed of a cleaning device 100 and a fluidically connected cleaning medium reservoir 110 as well as devices to be cleaned 102 according to an exemplary embodiment of the invention. FIG. 2 illustrates a three-dimensional back side view of the cleaning device 100 with cleaning medium reservoir 110 and devices to be cleaned 102 of FIG. 1. FIG. 3 illustrates an interior of a casing 126 of the cleaning device 100 of FIG. 1 and FIG. 2. FIG. 4 illustrates another view of the interior of the casing 126 of the cleaning device 100 of FIG. 1 to FIG. 3. FIG. 5 shows a part of the cleaning device 100 of FIG. 1 to FIG. 4 without casing 126 for illustrating a flow of cleaning medium during cleaning and during heating.

The arrangement 150 of FIG. 1 to FIG. 4 comprises a cleaning system and cleaning medium reservoir 110 embodied as tank or canister containing a cleaning medium such as a chemical cleaning liquid. The cleaning system comprises, in turn, cleaning device 100 and one or more devices to be cleaned 102 (five injectors for a helicopter in the described embodiment) each mounted on a respective one of multiple adapters 104 being shaped and dimensioned in accordance with the geometry of the devices to be cleaned 102.

The cleaning medium reservoir 110 contains the cleaning medium (such as a chemical alkaline solution) and is in fluid communication with the cleaning device 100 via several hose connections for enabling cleaning medium from the cleaning medium reservoir 110 to be driven through the devices to be cleaned 102, when mounted on the adapters 104. Preferably, the cleaning medium reservoir 110 is mounted in an interior of casing 126 of the cleaning device 100. A thermal insulation unit 152 in the casing 126 and at least partially surrounding the cleaning medium reservoir 110 may properly thermally insulate the cleaning medium reservoir 110 when mounted in the interior of the casing 126. Thus, heated cleaning medium in an interior of the cleaning medium reservoir 110 may be efficiently prevented from thermal equilibration with the environment. Furthermore, it is possible to provide a heating unit (not shown in FIG. 1 to FIG. 5, compare reference numeral 124' in FIG. 8) in the casing 126 for heating the cleaning medium reservoir 110 when accommodated in the casing 126.

Figure 7:
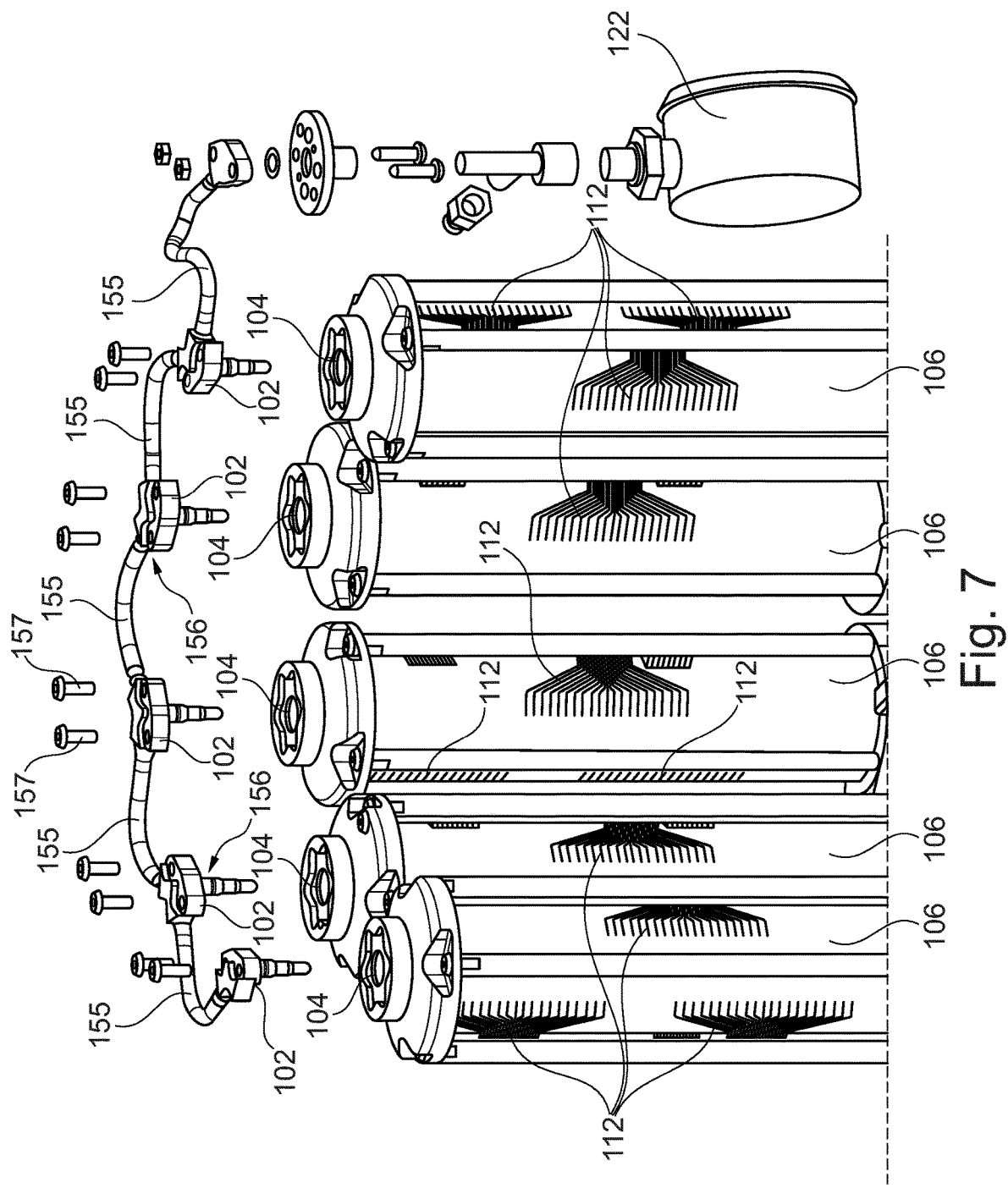
FIG. 7 shows an explosion view of a portion of a cleaning device according to an exemplary embodiment of the invention configured for cleaning multiple devices to be cleaned at the same time.

The cleaning device 100 for cleaning an interior hollow space of the devices to be cleaned 102 comprises the aforementioned adapters 104 each configured for mounting a respective one of the devices to be cleaned 102. Furthermore, the cleaning device 100 comprises a plurality of cleaning medium reception chambers 106, each assigned to a respective one of the adapters 104, and each configured for receiving cleaning medium which has been driven through the assigned device to be cleaned 102 when mounted on the assigned adapter 104. For instance, the cleaning medium reception chambers 106 may be glass cylinders which can be visually inspected by a user from an exterior position. More generally, the cleaning medium reception chambers 106 may be made of an optically transparent material for enabling inspection of cleaning medium driven through the respective device to be cleaned 102, when mounted on the respective adapter 104, into the respective cleaning medium reception chamber 106. As best shown in FIG. 7, the optically transparent cleaning medium reception chambers 106 may also comprise a scale 112 with markers for quantitatively indicating an amount of cleaning medium which has been driven through the assigned device to be cleaned 102 (mounted on the corresponding adapter 104) during the actual cleaning procedure.

Descriptively speaking, for each device to be cleaned 102, an assigned adapter 104 and an assigned cleaning medium reception chamber 106 (and optionally as well an assigned valve 116, compare FIG. 6) is provided. In contrast to this, a drive unit 108 for driving the cleaning medium through the cleaning device 100 (composed, in the present embodiment, of forcing pump 118 and suction pump 120) as well as the cleaning fluid accommodation reservoir 110 are provided in common for all devices to be cleaned 102 and being rinsed simultaneously. This can be accomplished by providing a flow splitter 156 upstream of the adapters 104 for splitting a flow of cleaning medium from the cleaning medium reservoir 110 for providing a parallel supply of cleaning medium to all devices to be cleaned 102 mounted on the respective adapters 104. Correspondingly, a flow combiner 158 is provided downstream of the cleaning medium reception chambers 106 for combining a flow of cleaning medium draining from all cleaning medium reception chambers 106.

By this configuration, it is possible to clean multiple devices to be cleaned 102 simultaneously, while enabling separate inspection of each individual cleaning result by providing individual cleaning medium reception chambers 106. This renders a parallel cleaning of multiple devices to be cleaned 102 possible, thereby increasing the efficiency of cleaning without loss of the possibility to carry out an individual assessment of the cleaning results or the success of the cleaning process. Thus, FIG. 1 to FIG. 4 show how multiple devices to be cleaned 102 are mounted on multiple adapters 104 so as to carry out a cleaning of all devices to be cleaned 102 simultaneously.

As already mentioned, the cleaning device 100 comprises drive unit 108 for driving cleaning medium from cleaning medium reservoir 110 through the adapters 104 and through the devices to be cleaned 102, when mounted on the adapters 104, and into the cleaning medium reception chambers 106. More specifically, the drive unit 108 comprises a pressure or forcing pump 118 upstream of the adapters 104 and comprises a suction pump 120 downstream of the cleaning medium reception chambers 106. Thus, the drive unit 108 comprises a pushing forcing pump 118 for driving cleaning medium from the cleaning medium reservoir 110 through the devices to be cleaned 102 mounted on the various adapters 104. Correspondingly, the drive unit 108 comprises a suction pump 120 for sucking, drawing or aspirating cleaning medium out of one or more or even all of the cleaning medium reception chambers 106, depending on the switching state of the individual valves 116. The forcing pump 118 pushes cleaning medium into the devices to be cleaned 102, whereas the suction pump 120 draws cleaning medium out of the cleaning medium reception chambers 106. Each of the cleaning medium reception chambers 106 comprises, at a respective bottom thereof, a respective outlet 114 for draining cleaning medium which has been previously driven through the device to be cleaned 102, when mounted on the adapter 104, into the cleaning medium reception chamber 106. By the sucking or aspirating function of the suction pump 120, the cleaning medium may be removed out of the cleaning medium reception chambers 106, for instance after optical inspection of the success of the cleaning procedure.

For selectively enabling or disabling the suction pump 120 to draw cleaning medium out of the cleaning medium reception chambers 106, each of the already mentioned valves 116 is arranged in fluid communication with a respective one of the outlets 114 of an assigned cleaning medium reception chamber 106 for selectively enabling or disabling draining of cleaning medium from the respective cleaning medium reception chamber 106.

As can be taken from FIG. 1 to FIG. 4 as well, a detection unit 122 may be provided for detecting information indicative of a flow rate and/or a pressure of cleaning medium driven through the devices to be cleaned 102 and mounted on the adapters 104. The detection unit 122 may comprise a flowmeter for detecting a flow rate and/or a pressure gauge for detecting a pressure of the cleaning medium. Also this detected information can be considered for analyzing success of a cleaning procedure and/or for detecting issues during the cleaning procedure (such as a leakage, a blockage, etc.).

Moreover, the cleaning device 100 comprises a housing or casing 126 in which the cleaning medium reservoir 110 is accommodated. Beyond this, the casing 126 may accommodate one or more further components of the cleaning device 100, for instance the drive unit 108, and a control unit 128 (such as a processor) for controlling overall operation of the cleaning device 100. Also one or more filters 157, 169 may be located in an interior of the casing 126.

During operation, the cleaning medium in the cleaning medium reservoir 110 within casing 126 of the cleaning device 100 can firstly be heated prior to cleaning and testing the devices to be cleaned 102, as will be described below in further detail referring to FIG. 5. The cleaning medium (such as a cleaning liquid) may show improved cleaning efficiency at an elevated (compared to room temperature) operating temperature of, for example, 60° C. During pre-heating the cleaning medium, the devices to be cleaned 102 (in particular injectors) can already be mounted to the jig or adapter 104. Once the devices to be cleaned 102 have been cleaned, they can be tested in a test mode.

FIG. 1 also shows a user interface 151 at the casing 126 via which a user may input commands to the cleaning device 100, and information may be displayed to the user.

FIG. 2 shows the result of a simple and user convenient procedure during which a user has inserted the cleaning medium reservoir 110 into a corresponding opening or recess formed in the casing 126. For establishing a desired fluidic connection, it may be sufficient for a user to connect hoses or tubes 153 to a flange 173 at the top side of the cleaning medium reservoir 110 and to fluidic interfaces 175 extending out of the casing 126. This renders the assembly of the arrangement 150 simple.

FIG. 3 shows an interior of the casing 126 and in particular shows that multiple components of the arrangement 150 are accommodated in the interior of the casing 126.

FIG. 4 illustrates how a thermal insulation 152 may be arranged close to the cleaning medium reservoir 110 to keep the latter heated.

FIG. 5 shows a part of cleaning device 100 illustrating a flow of cleaning medium during a cleaning mode and during a heating mode:

As shown, the cleaning device 100 comprises a closed loop cleaning medium path 133 configured for enabling cleaning medium to be driven along a closed loop from the cleaning medium reservoir 110 through the devices to be cleaned 102 mounted on the adapters 104 and via the cleaning medium reception chambers 106 back to the cleaning medium reservoir 110. More precisely, the closed loop cleaning medium path 133 extends from cleaning medium reservoir 110 through filter 157, forcing pump 118, heating unit 124, valve 159, detection unit 122, adapters 104, devices to be cleaned 102, cleaning medium reception chambers 106, filter 169, suction pump 120 and cleaning medium reservoir 110. As indicated by reference numeral 130 in parenthesis in FIG. 5 it may be possible alternatively to collect the used cleaning medium in a waste container 130 rather than driving it back into the cleaning medium reservoir 110.

Figure 8:
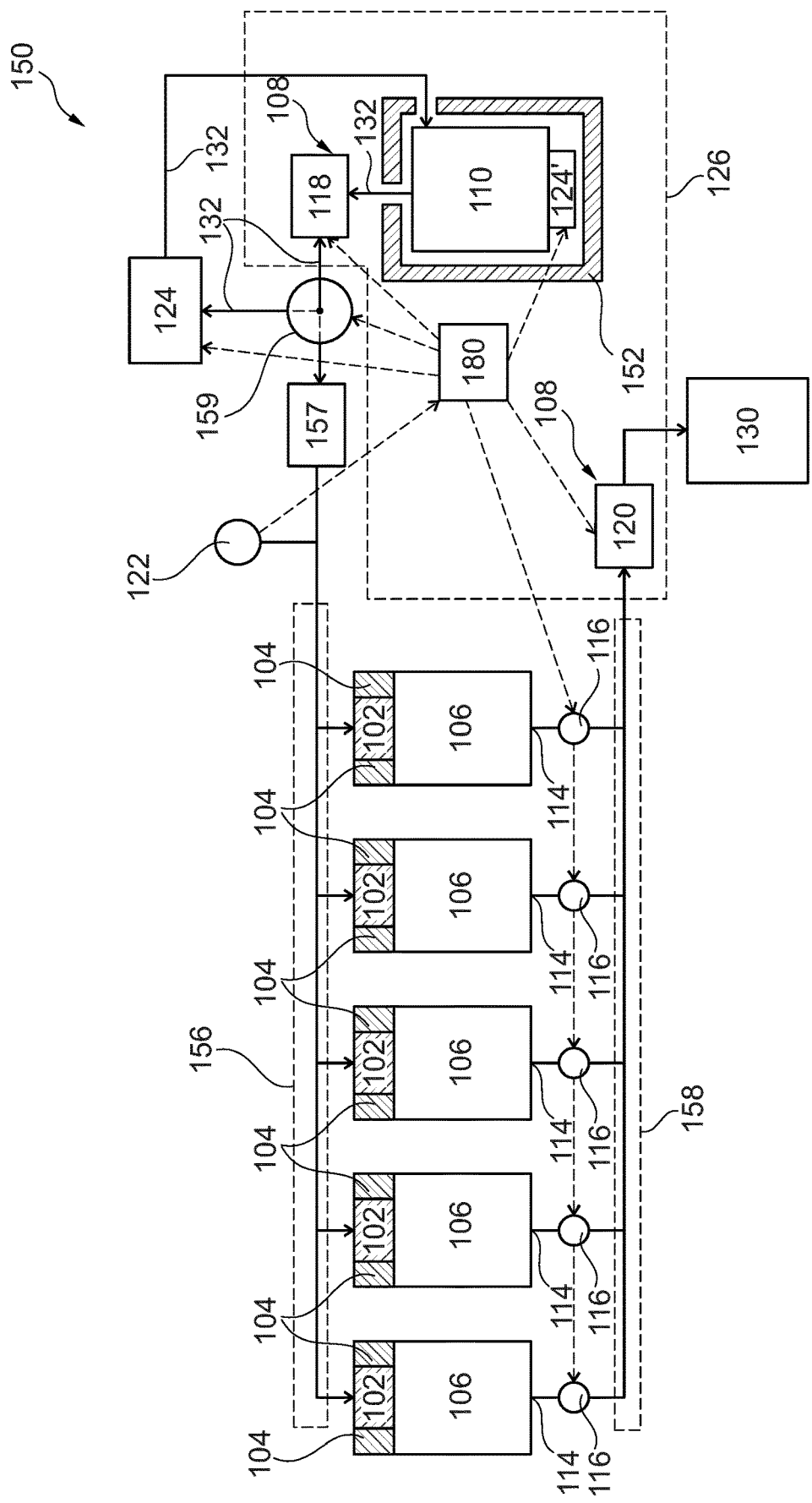
FIG. 8 is a schematic view of a cleaning arrangement according to an exemplary embodiment of the invention.

The valve 159 can be operated manually by a user or centrally under control of a control unit (compare reference numeral 180 in FIG. 8). When controlled automatically by such a control unit 180, it is possible that the control unit 180 switches the valve 159 automatically, if a user presses the button "heating", to the heating internal circle. If a user presses the button "cleaning" or "testing", the valve 159 switches automatically to the cleaning/testing circle.

Correspondingly, the cleaning device 100 is configured for carrying out a heating mode in which cleaning medium is driven from the cleaning medium reservoir 110 through a heating loop path 132 back into the cleaning medium reservoir 110. For providing such a pre-heating of cleaning medium prior to the cleaning procedure, a heating unit 124 (here embodied as heating coil surrounding or forming tubing of heating loop path 132) is arranged upstream of the adapter 104 for heating cleaning medium driven by the drive unit 108 from the cleaning medium reservoir 110 towards the device to be cleaned 102, when mounted on the adapter 104.

By operating valve 159 to bring it in a position corresponding to reference numeral 161, it is possible to activate the heating mode in which cleaning medium may be circulated along heating loop path 132 to thereby guide the cleaning medium once or multiple times through the heating unit 124 so as to bring the cleaning medium to a desired elevated temperature prior to starting the cleaning procedure.

By operating valve 159 to bring it in a position corresponding to reference numeral 163, it is possible to activate the cleaning mode in which the pre-heated cleaning medium may be circulated along closed loop cleaning medium path 133 to thereby guide the cleaning medium once or multiple times through the devices to be cleaned 102 during the cleaning procedure.

Thus, cleaning medium to be heated can be pumped by drive unit 108, more specifically by a forcing pump 118 of drive unit 108, from cleaning medium reservoir 110 through filter 157 and a heating coil as heating unit 124 up to valve 159. With the valve 159, the cleaning device 100 may be operated in a heating mode, see reference numeral 161, or in a cleaning or testing mode, see reference numeral 163. To adjust the corresponding heating mode, cleaning mode or testing mode, the valve 159 may be brought to the corresponding orientation, see reference numeral 165. For heating cleaning medium, a flow is established from cleaning medium reservoir 110 through filter 157, forcing pump 118, heating unit 124, valve 159 enabling a flow in an upward direction according to reference numeral 161 and from there back to cleaning medium reservoir 110. Such a heating procedure can be repeated once or multiple times until the heating medium in the cleaning medium reservoir 110 has reached a predetermined temperature, for instance 60° C.

In the cleaning mode, heated cleaning fluid can be pumped from cleaning fluid reservoir 110 through filter 157 and forcing pump 118 as well as through heating unit 124 into the path denoted with reference numeral 163. From there, the cleaning medium may be guided through the detection unit 122, which may be a flow sensor. From there, the heated cleaning medium may be pumped to a respective adapter 104 and through the respective device to be cleaned 102. After cleaning, the cleaning medium may be drained through the outlets 106 (not shown in FIG. 5) and may be supplied via an interface 167 through further filter 169 and through suction pump 120 of drive unit 108. From there, the used but filtered cleaning medium may be delivered back to cleaning medium reservoir 110 (or alternatively to a waste container 130 as shown in FIG. 8).

Figure 6:
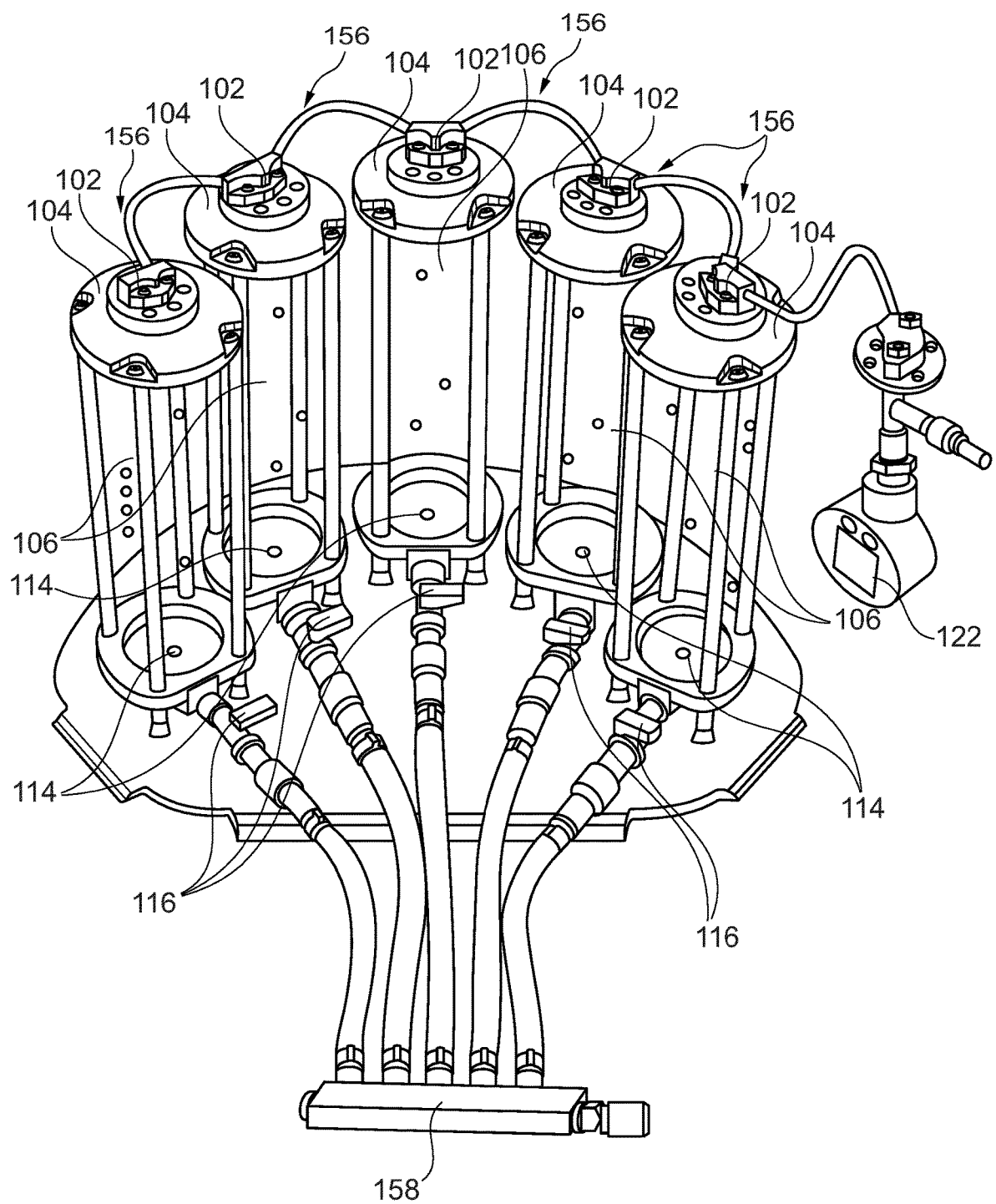
FIG. 6 shows a portion of a cleaning device according to an exemplary embodiment of the invention configured for cleaning multiple devices to be cleaned at the same time.

FIG. 6 shows a portion of a cleaning device 100 according to an exemplary embodiment of the invention configured for cleaning multiple devices to be cleaned 102 at the same time.

More specifically, FIG. 6 shows a configuration of five sets of devices to be cleaned 102, adapters 104 and cleaning medium reception chambers 106 so as to carry out cleaning of five devices to be cleaned 102 simultaneously. The valves 116 are here adapted as manually operable taps. A flow combiner 158 downstream of the valves 116 allows to combine a flow of cleaning medium draining through one or more of the outlets 114 at the bottom of the respective cleaning fluid accommodation chambers 106.

FIG. 7 shows an explosion view of a portion of a cleaning device 100 according to an exemplary embodiment of the invention configured for cleaning multiple devices to be cleaned 102 at the same time. FIG. 7 shows how an assembly process of components of the cleaning system can be carried out. The individual devices to be cleaned 102, injectors in the present embodiment, may be connected via connection tubing 155 serially so as to carry out a cleaning process of multiple devices to be cleaned 102 simultaneously. Fastening elements 157, for instance screws or bolts, may be used for fastening the respective device to be cleaned 102 at the assigned adapter 104. The detection unit 122, such as a flowmeter or pressure gauge, may be connected to the tubing 155 as well. FIG. 6 also shows in detail scales 122 provided at the glass cylinders embodying the cleaning medium reception chambers 106 so as to enable visual inspection of the result of the cleaning procedure.

FIG. 8 is a schematic view of a cleaning arrangement 150 according to an exemplary embodiment of the invention. More specifically, FIG. 8 gives an overview of the entire operation of the arrangement 150, which can be configured in a similar way as described above.

Additionally, a further heating unit 124' is provided within casing 126 and within thermal insulation unit 152. The further heating unit 124' is thermally coupled to the cleaning medium reservoir 110 for contributing to the heating of the cleaning medium. Thus, additionally or alternatively to heating unit 124, further heating unit 124' may heat cleaning medium within cleaning medium reservoir 110.

FIG. 8 also illustrates a control unit 180 (such as a processor) controlling operation of the arrangement 150 and of the cleaning device 100 as a whole. In particular, control unit 180 may receive detection data from detection unit 122. Control unit 180 may control heating units 124, 124', valves 159, 116 and drive unit 108.

FIG. 8 also shows that cleaning medium which has been used for cleaning a respective one of the devices to be cleaned 102, can be accumulated in a waste container 130 for disposal or recycling, rather than being pumped back into the cleaning medium reservoir 110 for repeated use. The provision of a waste container 130 may be in particular appropriate for safety-relevant devices to be cleaned 102, such as injectors for helicopters.

Figure 9:
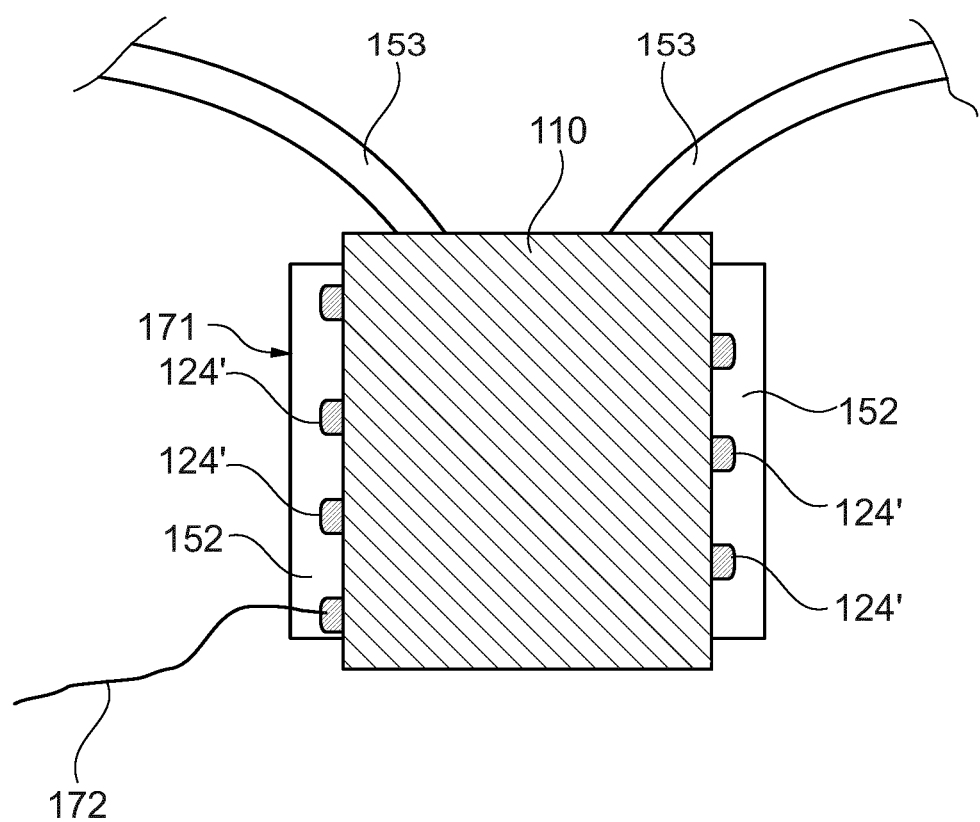
FIG. 9 is a schematic cross-sectional view of a standalone cleaning medium reservoir surrounded by a jacket-like combined heating and thermal insulation sleeve.

FIG. 9 is a schematic cross-sectional view of a standalone cleaning medium reservoir 110 surrounded by a jacket-like combined heating and thermal insulation sleeve.

More specifically, the part of arrangement 150 according to the exemplary embodiment illustrated in FIG. 9 comprises a thermal insulation unit 152 which surrounds a standalone cleaning medium reservoir 110 to thereby thermally isolate the standalone cleaning medium reservoir 110 with regard to an environment. Furthermore, the arrangement 150 comprises a heating unit 124' surrounding the standalone cleaning medium reservoir 110 to thereby heat the cleaning medium in the standalone cleaning medium reservoir 110. Advantageously, the thermal insulation unit 152 and the heating unit 124' are combined to form parts of a sleeve 171 being removably attachable to the standalone cleaning medium reservoir 110.

As shown in FIG. 9, sleeve 171 is attached to the standalone cleaning medium reservoir 110 so as to contact the lateral surface of the cleaning medium reservoir 110. The heating unit 124', which may for instance be embodied as an ohmic heating coil (or alternatively as a fluid heating, etc.) surrounds the cleaning medium reservoir 110 with (preferably direct) thermal contact. Exterior of the heating unit 124', the thermal insulation unit 152 is arranged so as to provide a proper thermal insulation between the heated standalone cleaning medium reservoir 110 on the one hand and the environment on the other hand.

Tubes 153 accomplishing fluid communication of the cleaning medium in the cleaning medium reservoir 110 with the rest of the cleaning device 100 and an electric supply cable 172 for supplying electric current to the (here electric) heating unit 124' are shown as well in FIG. 9.

Figure 10:
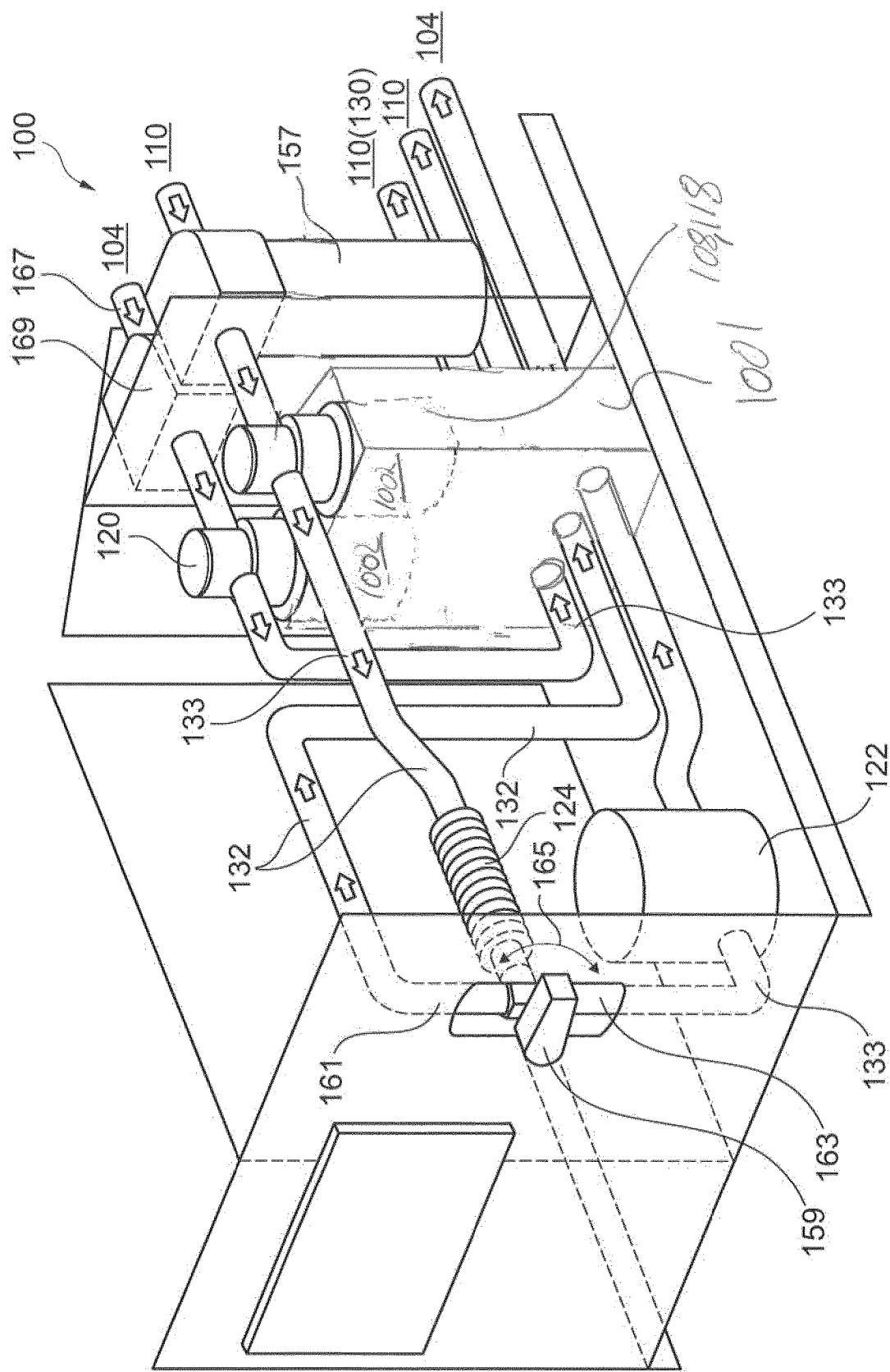
FIG. 10 shows similar to FIG. 5 a part of the cleaning device of FIG. 1 to FIG. 4, wherein a cooling block is provided for cooling a drive unit according to an exemplary embodiment of the present invention.

FIG. 10 shows a similar embodiment as shown in FIG. 5, wherein a cooling block is provided for cooling a respective drive unit 108.

FIG. 10 shows a part of cleaning device 100 illustrating a flow of cleaning medium during a cleaning mode and during a heating mode:

As shown, the cleaning device 100 comprises a closed loop cleaning medium path 133 configured for enabling cleaning medium to be driven along a closed loop from the cleaning medium reservoir 110 through the devices to be cleaned 102 mounted on the adapters 104 and via the cleaning medium reception chambers 106 back to the cleaning medium reservoir 110. More precisely, the closed loop cleaning medium path 133 extends from cleaning medium reservoir 110 through filter 157, forcing pump 118, heating unit 124, valve 159, detection unit 122, adapters 104, devices to be cleaned 102, cleaning medium reception chambers 106, filter 169, suction pump 120 and cleaning medium reservoir 110. As indicated by reference numeral 130 in parenthesis in FIG. 5 it may be possible alternatively to collect the used cleaning medium in a waste container 130 rather than driving it back into the cleaning medium reservoir 110.

The valve 159 can be operated manually by a user or centrally under control of a control unit (compare reference numeral 180 in FIG. 8). When controlled automatically by such a control unit 180, it is possible that the control unit 180 switches the valve 159 automatically, if a user presses the button "heating", to the heating internal circle. If a user presses the button "cleaning" or "testing", the valve 159 switches automatically to the cleaning/testing circle.

Correspondingly, the cleaning device 100 is configured for carrying out a heating mode in which cleaning medium is driven from the cleaning medium reservoir 110 through a heating loop path 132 back into the cleaning medium reservoir 110. For providing such a pre-heating of cleaning medium prior to the cleaning procedure, a heating unit 124 (here embodied as heating coil surrounding or forming tubing of heating loop path 132) is arranged upstream of the adapter 104 for heating cleaning medium driven by the drive unit 108 from the cleaning medium reservoir 110 towards the device to be cleaned 102, when mounted on the adapter 104.

The cleaning medium to be heated can be pumped by drive unit 108, more specifically by a forcing pump 118 of drive unit 108, from cleaning medium reservoir 110 through filter 157 and a heating coil as heating unit 124 up to valve 159. With the valve 159, the cleaning device 100 may be operated in a heating mode, see reference numeral 161, or in a cleaning or testing mode, see reference numeral 163. To adjust the corresponding heating mode, cleaning mode or testing mode, the valve 159 may be brought to the corresponding orientation, see reference numeral 165. For heating cleaning medium, a flow is established from cleaning medium reservoir 110 through filter 157, forcing pump 118, heating unit 124, valve 159 enabling a flow in an upward direction according to reference numeral 161 and from there back to cleaning medium reservoir 110. Such a heating procedure can be repeated once or multiple times until the heating medium in the cleaning medium reservoir 110 has reached a predetermined temperature, for instance 50° C. to 60° C., in particular approximately 55° C.

In the cleaning mode, heated cleaning fluid can be pumped from cleaning fluid reservoir 110 through filter 157 and forcing pump 118 as well as through heating unit 124 into the path denoted with reference numeral 163. From there, the cleaning medium may be guided through the detection unit 122, which may be a flow sensor. From there, the heated cleaning medium may be pumped to a respective adapter 104 and through the respective device to be cleaned 102. After cleaning, the cleaning medium may be drained through the outlets 106 (not shown in FIG. 5) and may be supplied via an interface 167 through further filter 169 and through suction pump 120 of drive unit 108. From there, the used but filtered cleaning medium may be delivered back to cleaning medium reservoir 110 (or alternatively to a waste container 130 as shown in FIG. 8).

In addition to the embodiment shown in FIG. 5, the embodiment shown in FIG. 10 comprises a thermal block 1001. The thermal block 1001 can be made of a highly thermal conductive material, such as a metal material, preferably aluminium or copper. The thermal block 1001 is thermally coupled to a motor unit 1002 of the drive units 108. Additionally, tubes guiding the cleaning medium through the heating loop path 132 or the closed loop cleaning medium path 133 for example to the cleaning medium reservoir 110 or tubes guiding the cleaning medium through the closed loop cleaning medium path 133 to the adapter 104 for mounting the device to be cleaned 102 are thermally coupled to the thermal block 1001 as well. Hence, a thermal bridge between the motor unit 1002 and the respective cleaning medium in the respective paths 132, 123 is provided by the thermal block 1002. This has the technical effect, that the motor units 1002 can be cooled by the cleaning medium and the cleaning medium can be heated up by the motor unit 1002, respectively. For example, the motor units 1002 may be heated up during operation without cooling till 100° C. and higher. Since the temperature of the heated cleaning medium is about 55° C., the cooling of the motor units 1002 is possible. Additionally, the heating of the cleaning medium reservoir 110 and the heating unit 124 may be supported by the thermal energy taken from the motor unit 1002. Hence, the operation heat of the drive unit 108 may be reduced and the external energy for heating up the cleaning medium may be reduced, such that the overall efficiency of the system is improved.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

Implementation of the invention is not limited to the preferred embodiments shown in the figures and described above. Instead, a multiplicity of variants are possible which use the solutions shown and the principle according to the invention even in the case of fundamentally different embodiments.

The invention claimed is:

1. A cleaning device for cleaning an interior of a device to be cleaned, wherein the cleaning device comprises:
an adapter for mounting the device to be cleaned;
a cleaning medium reception chamber for receiving a cleaning medium driven through the device to be cleaned when mounted on the adapter;
a drive unit for driving the cleaning medium from a cleaning medium reservoir through the device to be cleaned, when mounted on the adapter, and into the cleaning medium reception chamber;
a detection unit comprising a flowmeter for measuring a flow rate of the cleaning medium, and a thermometer for measuring a temperature of the cleaning medium; and
a central control unit programmed to receive the temperature from the thermometer and correct the flow rate measured by the flowmeter so as to compensate a change of viscosity at changing temperatures,
wherein the control unit is programmed to perform a heating mode before cleaning the device to be cleaned, and
wherein the heating mode comprises circulating the cleaning medium in a heating loop which is external to the cleaning medium reservoir, the heating loop exits and enters the cleaning medium reservoir.

2. Cleaning device according to claim 1,
wherein the adapter is mounted or configured to be mounted on the cleaning medium reception chamber.

3. Cleaning device according to claim 1,
wherein the cleaning medium reception chamber is at least partially optically transparent for
enabling optical inspection of the cleaning medium driven through the device to be cleaned, when mounted on the adapter, and into the cleaning medium reception chamber.

4. Cleaning device according to claim 1,
wherein the cleaning medium reception chamber comprises, at a bottom opposing the adapter,
an outlet for draining the cleaning medium driven through the device to be cleaned, when mounted on the adapter, and into the cleaning medium reception chamber.

5. Cleaning device according to claim 1,
wherein the drive unit comprises a forcing pump for pushing the cleaning medium through the device to be cleaned, when mounted on the adapter.

6. Cleaning device according to claim 1,
wherein the detection unit is arranged upstream of the adapter and for
detecting the flow rate and/or a pressure of the cleaning medium driven through the device to be cleaned, when mounted on the adapter.

7. Cleaning device according to claim 2, further comprising at least one further adapter for mounting at least one further device to be cleaned, and at least one further cleaning medium reception chamber for receiving cleaning medium driven through the at least on further device to be cleaned, when mounted on the at least one further adapter, wherein the drive unit is configured for driving cleaning medium from the cleaning medium reservoir simultaneously through the device to be cleaned into the cleaning medium reception chamber and through the at least one further device to be cleaned into the at least one further cleaning medium reception chamber.

8. Cleaning device according to claim 1, further comprising an insulating unit surrounding a heating unit, thereby forming a sleeve around the cleaning medium reservoir.

9. Cleaning device according to claim 1, further comprising a casing in which the cleaning medium reservoir is accommodatable or accommodated.

10. Cleaning device according to claim 1, further comprising a waste container in which cleaning medium draining from the cleaning medium reception chamber is collected.

11. Cleaning device according to claim 1, further comprising a closed loop cleaning medium path, including at least one filter, configured
for enabling the cleaning medium to be driven along a closed loop from the cleaning medium reservoir through the device to be cleaned, when mounted on the adapter, and via the cleaning medium reception chamber back to the cleaning medium reservoir.

12. Cleaning device according to claim 1, further comprising a pump configured to drive the cleaning medium from the cleaning medium reservoir through the heating loop back into the cleaning medium reservoir.

13. Cleaning device according to claim 1, further comprising a thermal block which is thermally coupled to the drive unit, wherein the thermal block is further thermally coupled to the cleaning medium as the cleaning medium flows to the adapter or the cleaning medium reservoir for providing a thermal bridge between the cleaning medium and the drive unit.

14. Cleaning device according to claim 1, comprising one of the following features:
wherein the device to be cleaned is an injector;
wherein the device to be cleaned is a normally-closed device to be opened by a flow force of the driven cleaning medium; or
wherein the device to be cleaned is a normally-closed device to be opened by applying an electric trigger signal to the device to be cleaned.

15. An arrangement, comprising:
a cleaning device according to claim 1;
a cleaning medium reservoir containing a cleaning medium and being in fluid communication with the cleaning device for enabling the cleaning medium from the cleaning medium reservoir to be driven by the drive unit through the device to be cleaned, when mounted on the adapter, and into the cleaning medium reception chamber.

16. Arrangement according to claim 15, wherein the cleaning medium reservoir is configured as a standalone cleaning medium reservoir.

17. Arrangement according to claim 16, comprising
a thermal insulation unit at least partially surrounding the standalone cleaning medium reservoir to thereby thermally isolate the standalone cleaning medium reservoir with regard to an environment; and/or
a heating unit at least partially surrounding the standalone cleaning medium reservoir and configured to heat the standalone cleaning medium reservoir, wherein the thermal insulation unit and the heating unit are configured as a sleeve being removably attachable to the standalone cleaning medium reservoir.

18. Arrangement according to claim 15, wherein the cleaning medium reservoir is mounted in an interior of a casing of the cleaning device,
wherein the arrangement comprises:
a thermal insulation unit for thermally insulating the cleaning medium reservoir; and/or
a heating unit configured for heating the cleaning medium reservoir.

19. A method of cleaning a device to be cleaned, wherein the method comprises:
providing a cleaning device according to claim 1;
mounting the device to be cleaned on the adapter and in fluid communication with the cleaning medium reception chamber;
driving a cleaning medium from a cleaning medium reservoir through the device to be cleaned into the cleaning medium reception chamber.

20. Method according to claim 19, comprising at least one of the following features:
accumulating and/or inspecting the cleaning medium driven into the cleaning medium reception chamber:
analyzing at least one of the group consisting of an amount of cleaning medium accumulated in the cleaning medium reception chamber, and a spray pattern of the cleaning medium in the cleaning medium reception chamber.

* * * * *